(12) United States Patent
Moon et al.

(10) Patent No.: US 7,328,024 B2
(45) Date of Patent: Feb. 5, 2008

(54) MOBILE COMMUNICATION SYSTEM, MOBILE COMMUNICATION METHOD, AND MOBILE STATION SUITABLY USED FOR THE SAME

(75) Inventors: Sung Uk Moon, Tokyo (JP); Takehiro Nakamura, Tokyo (JP); Minami Ishii, Tokyo (JP); Masafumi Usuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 224 days.

(21) Appl. No.: 10/675,967

(22) Filed: Oct. 2, 2003

(65) Prior Publication Data

US 2004/0137867 A1    Jul. 15, 2004

(30) Foreign Application Priority Data

Oct. 4, 2002    (JP)    ............................. 2002-292929

(51) Int. Cl.
*H04Q 7/20* (2006.01)
*H04B 7/00* (2006.01)

(52) U.S. Cl. ...................... 455/450; 450/450; 450/509; 370/329

(58) Field of Classification Search ................ 455/425, 455/509–510, 515, 517, 63.1, 67.13, 69, 455/70, 226.2, 226.3, 16, 24, 450–452.2, 455/522; 370/230–235.1, 252, 243, 329–330
See application file for complete search history.

(56) References Cited

U.S. PATENT DOCUMENTS

| 5,241,548 | A | | 8/1993 | Dillon et al. |
| 5,517,507 | A | * | 5/1996 | Needham et al. ........... 714/748 |
| 5,546,411 | A | * | 8/1996 | Leitch et al. ................ 714/708 |

(Continued)

FOREIGN PATENT DOCUMENTS

| DE | 101 64 665 | 8/2002 |
| JP | 63-31328 | 2/1988 |
| JP | 5-235951 | 9/1993 |

(Continued)

OTHER PUBLICATIONS

3GPP TS 23.041 V3.3.0 (Oct. 2000), "3rd Generation Partnership Project: Technical Specification Group Terminals; Technical Realization of Cell Broadcast Service (CBS) (Release 1999)".
3GPP TS 25.324 V3.3.0 (Dec. 2000), "3rd Generation Partnership Project; Technical Specification Group Radio Access Network; Broadcast/Multicast Control BMC (Release 1999)".

*Primary Examiner*—Simon Nguyen
(74) *Attorney, Agent, or Firm*—Oblon, Spivak, McClelland, Maier & Neustadt, P.C.

(57) ABSTRACT

The object of the present invention is provide a mobile communication system which can reduce power consumption of a mobile station without increasing the number of times the data signals which are to be received by the mobile station are retransmitted. The base station 10 comprises a signal transmitter 11 configured to transmit the data signal a to the mobile station 30 within a predetermined period, and transmit each of retransmission signals a1 to a3 of the data signal a, in a form different from that of the data signal a, from the base station 10 to the mobile station 30 within the predetermined period A. The mobile station 30 comprises a receiving processor 31 configured to carry out receiving processing of the data signal a or the retransmission signal a1 within the predetermined period A; a communication quality detector 32 configured to detect a communication quality of the data signal a or the retransmission signal a1; and a reception processing method decider 33 configured to decide a reception processing method for the data signal a or the retransmission signal a1 in the predetermined period A, in accordance with the communication quality detection result.

10 Claims, 6 Drawing Sheets

U.S. PATENT DOCUMENTS

| | | |
|---|---|---|
| 6,044,486 A | 3/2000 | Underseth et al. |
| 2002/0028688 A1* | 3/2002 | Lee et al. .................... 455/502 |
| 2002/0071407 A1* | 6/2002 | Koo et al. ................... 370/335 |
| 2002/0080719 A1* | 6/2002 | Parkvall et al. ............. 370/235 |
| 2002/0082039 A1* | 6/2002 | Ue et al. ..................... 455/522 |
| 2002/0168945 A1* | 11/2002 | Hwang et al. ................. 455/69 |
| 2003/0012195 A1 | 1/2003 | Ohkubo et al. |
| 2003/0072266 A1* | 4/2003 | Uesugi et al. ............... 370/236 |
| 2004/0005882 A1* | 1/2004 | Yoshii ...................... 455/422.1 |
| 2004/0248579 A1* | 12/2004 | Fukui et al. ................ 455/450 |

FOREIGN PATENT DOCUMENTS

| | | |
|---|---|---|
| JP | 8-32596 | 2/1996 |
| JP | 2001-119751 | 4/2001 |
| JP | 2004-502325 | 1/2004 |
| WO | WO 01/78324 A1 | 10/2001 |

\* cited by examiner

MOBILE COMMUNICATION SYSTEM, MOBILE COMMUNICATION METHOD, AND MOBILE STATION SUITABLY USED FOR THE SAME

CROSS REFERENCE TO RELATED APPLICATION

This application is based upon and claims the benefit of priority from the prior Japanese Patent Application No. P2002-292929, filed on Oct. 4, 2002; the entire contents of which are incorporated herein by reference.

BACKGROUND OF THE INVENTION

1. Field of the Invention

The present invention relates to a mobile communication system which transmits a data signal from a base station to a mobile station, a mobile communication method, and a mobile station suitably used for the same.

2. Description of the Related Art

Figure 1:
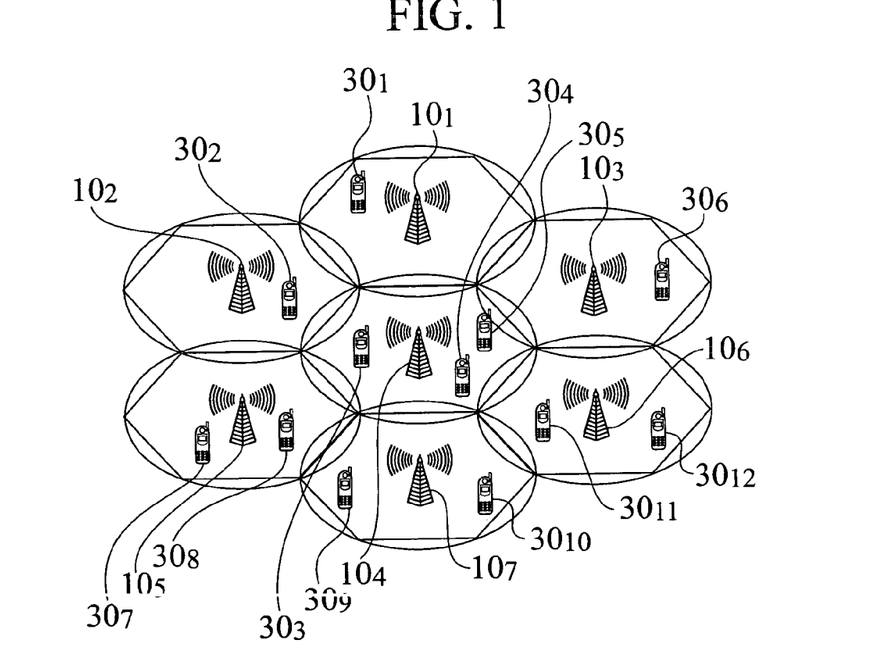
FIG. 1 is a diagram showing an entire configuration of a mobile communication system for carrying out broadcast communication according to a prior art.

As shown in FIG. 1, broadcast communication whereby one or a plurality of base stations 101 to 107 transmit common information (data signal) to unspecified mobile stations 301 to 3012 in predetermined areas all at once is known in a conventional mobile communication system.

Figure 2:
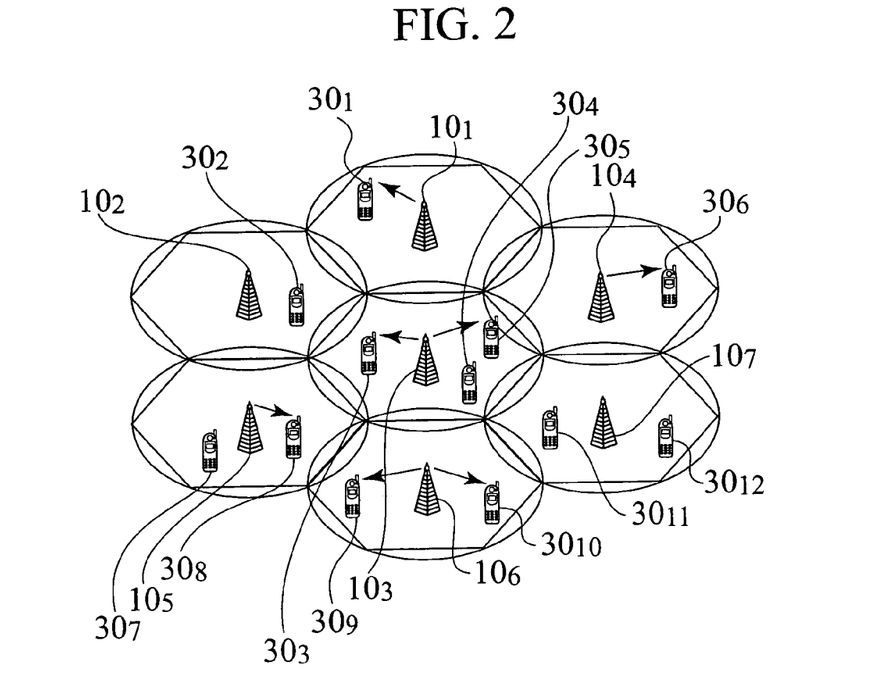
FIG. 2 is a diagram showing an entire configuration of a mobile communication system for carrying out multicast communication according to a prior art.

As shown in FIG. 2, multicast communication whereby one or a plurality of base stations 101 to 107 transmit common information to a plurality of mobile stations joining in (belonging to) a specific group in predetermined areas all at once is known in a conventional mobile communication system.

However, there is a problem in that communication qualities of signals received by the mobile stations 301 to 3012 are different from one another depending on a propagation distance and a propagation environment between the base stations 101 to 107 and the mobile stations 301 to 3012, so that the number of times that the base stations 101 to 107 transmit (retransmit) the common information (data signal) is increased when retransmission of the common information is requested for each of the mobile stations 301 to 3012, in the conventional mobile communication system such as the broadcast system or the multicast system, in which the common information is transmitted to the plurality of mobile stations 301 to 3012.

Moreover, there is a problem in that it is necessary to carry out reception processing of a long signal containing a redundant signal for error correction even at a mobile station in which a communication quality of a received signal is good when the redundant signal for error correction is used in order to reduce the number of times the common information is retransmitted, so that power consumption of the mobile station becomes larger in the conventional mobile communication system.

BRIEF SUMMARY OF THE INVENTION

In view of the foregoing, it is an object of the present invention to provide a mobile communication system which can reduce power consumption of a mobile station without increasing the number of times the data signals which are to be received by the mobile station are retransmitted, a mobile communication method, and a mobile station suitably used for the same.

A first aspect of the present invention is summarized as a mobile communication system which transmits a data signal from a base station to a mobile station.

The base station comprises a signal transmitter configured to transmit the data signal to the mobile station within a predetermined period, and transmit each of retransmission signals of the data signal, in a form different from that of the data signal, from the base station to the mobile station within the predetermined period.

The mobile station comprises a receiving processor configured to carry out receiving processing of the data signal or the retransmission signal within the predetermined period; a communication quality detector configured to detect a communication quality of the data signal or the retransmission signal; and a reception processing method decider configured to decide a reception processing method for the data signal or the retransmission signal in the predetermined period, in accordance with the communication quality detection result.

A second aspect of the present invention is summarized as a mobile communication method for transmitting a data signal from a base station to a mobile station.

The method comprises the steps of (A) transmitting the data signal from the base station to the mobile station within a predetermined period, and transmitting each of retransmission signals of the data signal, in a form different from that of the data signal, from the base station to the mobile station within the predetermined period; (B) carrying out receiving processing of the data signal or the retransmission signal within the predetermined period in the mobile station; (C) detecting a communication quality of the data signal or the retransmission signal in the mobile station; and (D) deciding a reception processing method for the data signal or the retransmission signal in the predetermined period, in accordance with the communication quality detection result in the mobile station.

A third aspect of the present invention is summarized as a mobile station for receiving a data signal from a base station.

The mobile station comprises a receiving processor configured to carry out receiving processing of the data signal or a retransmission signal of the data signal within a predetermined period; a communication quality detector configured to detect a communication quality of the data signal or the retransmission signal; and a reception processing method decider configured to decide whether or not to receive the data signal or the retransmission signal in the predetermined period, in accordance with the communication quality detection result.

A fourth aspect of the present invention is summarized as a mobile station for receiving a data signal from a base station. The mobile station comprises a receiving processor configured to carry out receiving processing of the data signal or a retransmission signal of the data signal within a predetermined period; a communication quality detector configured to detect a communication quality of the data signal or the retransmission signal; and a reception processing method decider configured to decide whether or not to decode the data signal or the retransmission signal in the predetermined period, in accordance with the communication quality detection result.

In the third or fourth aspect, the communication quality detector may detect at least one of a signal-to-interference ratio (SIR) and a received power as the communication quality.

DETAILED DESCRIPTION OF THE INVENTION

<A Configuration of a Mobile Communication System of an Embodiment of the Present Invention>

A configuration of a mobile communication system according to an embodiment of the present invention will now be described with reference to FIGS. 3 and 4. A mobile communication system 1 according to this embodiment transmits data signals from a base station (transmitter) 10 to a mobile station (receiver) 30.

Figure 3:
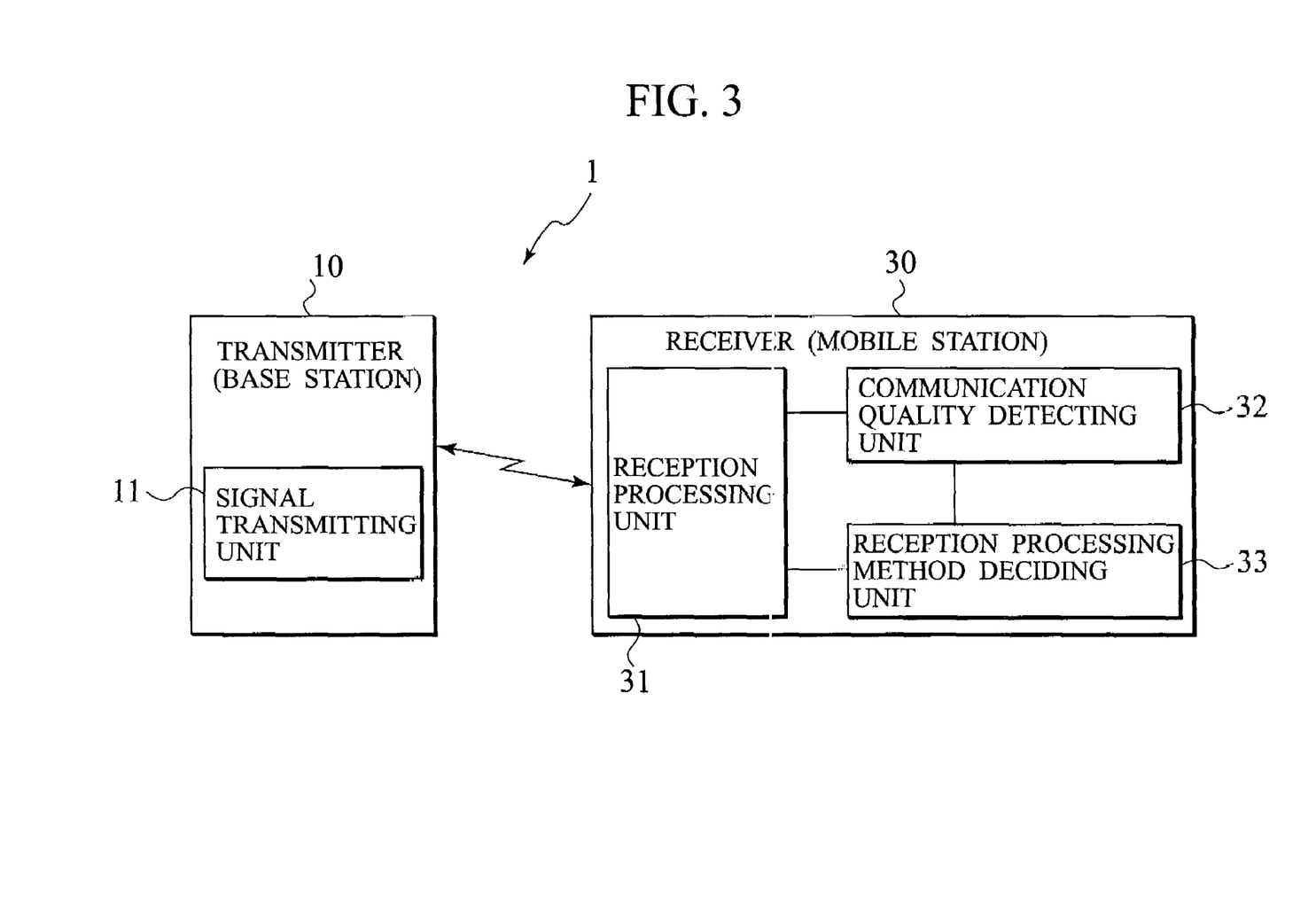
FIG. 3 is a diagram showing a configuration of a mobile communication system according to an embodiment of the present invention.

As shown in FIG. 3, the base station 10 includes a signal transmitting unit 11. The signal transmitting unit 11 is configured to transmit the data signals and retransmission signals of the data signals to the mobile station 30 within a predetermined period. The data signals and the retransmission signals may be generated at a radio control unit (not shown) or the base station 10.

Figure 4:
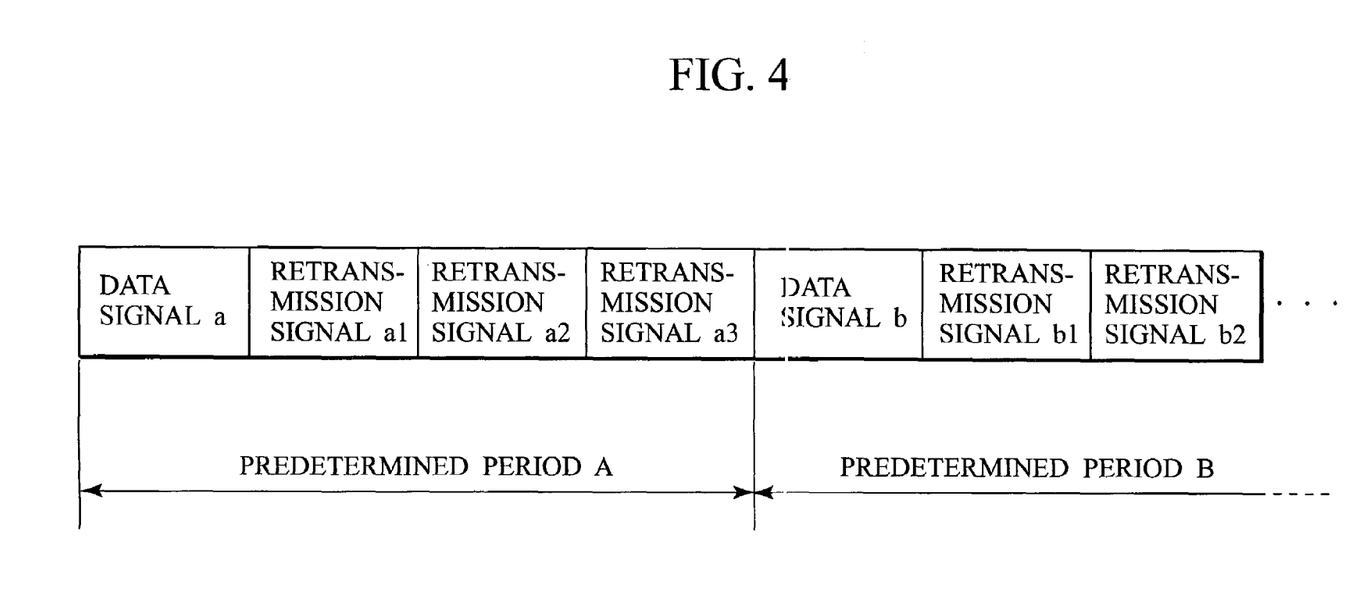
FIG. 4 is a diagram showing data signals and retransmission signals transmitted from a base station of the mobile communication system according to the embodiment of the present invention.

For example, as shown in FIG. 4, the signal transmitting unit 11 transmits a data signal a, a retransmission signal a1 of the data signal a, a retransmission signal a2 of the data signal a, and a retransmission signal a3 of the data signal a in this order to the mobile station 30 within a predetermined period A.

The retransmission signals a1 to a3 of the data signal a are generated by copying the data signal a.

The signal transmitting unit 11 may transmit each of the retransmission signals a1 to a3 in a form different from that of the data signal a within the predetermined period A.

For example, the signal transmitting unit 11 can transmit the retransmission signals a1 to a3 of the data signal a and the data signal a as different encoding series by changing rate matching parameters between the retransmission signal a1 to a3 of the data signal a and the data signal a.

As shown in FIG. 3, the mobile station 30 includes a reception processing unit 31, a communication quality detecting unit 32, and a reception processing method deciding unit 33.

The reception processing unit 31 is configured to carry out reception processing of the data signals or the retransmission signals within the predetermined period, based on a reception processing method decided by the reception processing method deciding unit 33.

Specifically, the reception processing unit 31 includes a receiving unit and a decoding unit. The receiving unit is configured to receive the data signals or the retransmission signals transmitted from the base station 10. The decoding unit is configured to decode the received data signals or the received retransmission signals.

More specifically, the receiving unit of the reception processing unit 31 determines, in the predetermined period A, whether or not to receive each of the data signal a, the retransmission signal a1, the retransmission signal a2, and the retransmission signal a3, based on the reception processing method decided by the reception processing method deciding unit 33.

The decoding unit of the reception processing unit 31 determines, in the predetermined period A, whether or not to decode each of the data signal a, the retransmission signal a1, the retransmission signal a2, and the retransmission signal a3, based on the reception processing method decided by the reception processing method deciding unit 33.

When each of the retransmission signals a1 to a3 of the data signal a is transmitted in a form different from that of the data signal a within the predetermined period A, the reception processing unit 31, for example, carries out rate matching by using different parameters between the retransmission signals a1 to a3 of the data signal a and the data signal a to synthesize codes of the retransmission signals a1 to a3 of the data signal a and the data signal a.

The communication quality detecting unit 32 is configured to detect a communication quality of the data signal or the retransmission signal. For example, the communication quality detecting unit 32 detects at least one of a signal error, a signal-to-interference ratio (SIR) and a received power as the communication quality.

The reception processing method deciding unit 33 is configured to decide a reception processing method for the data signal or the retransmission signal in the predetermined period in accordance with a communication quality detection result detected by the communication quality detecting unit 32.

Specifically, when the communication quality result of the data signal a satisfies a desired communication quality, the reception processing method deciding unit 33 decides to change the reception processing method which is to be used by the reception processing unit 31.

On the other hand, when the communication quality result of the data signal a (or retransmission signal a1 or the like) does not satisfy the desired communication quality, the reception processing method deciding unit 33 receives the next retransmission signal a1 (or retransmission signal a2 or the like).

The reception processing method deciding unit 33 may decide the reception processing method based on a communication quality of a current signal or based on a combination of the communication qualities of the current signal and a past signal.

For example, assuming that a current signal is the retransmission signal a2, the reception processing method deciding unit 33 may decide a reception processing method based on a communication quality of the retransmission signal a2, based on a communication quality of the retransmission signal a1 (past signal) and the communication quality of the retransmission signal a2, based on a communication quality of the data signal a (past signal) and the communication quality of the retransmission signal a2, or based on the communication quality of the data signal a (past signal), the communication quality of the retransmission signal a1 (past signal) and the communication quality of the retransmission signal a2.

<An Operation of the Mobile Communication System of the Embodiment>

An operation of the mobile communication system 1 according to this embodiment will be described with reference to FIG. 5.

Figure 5:
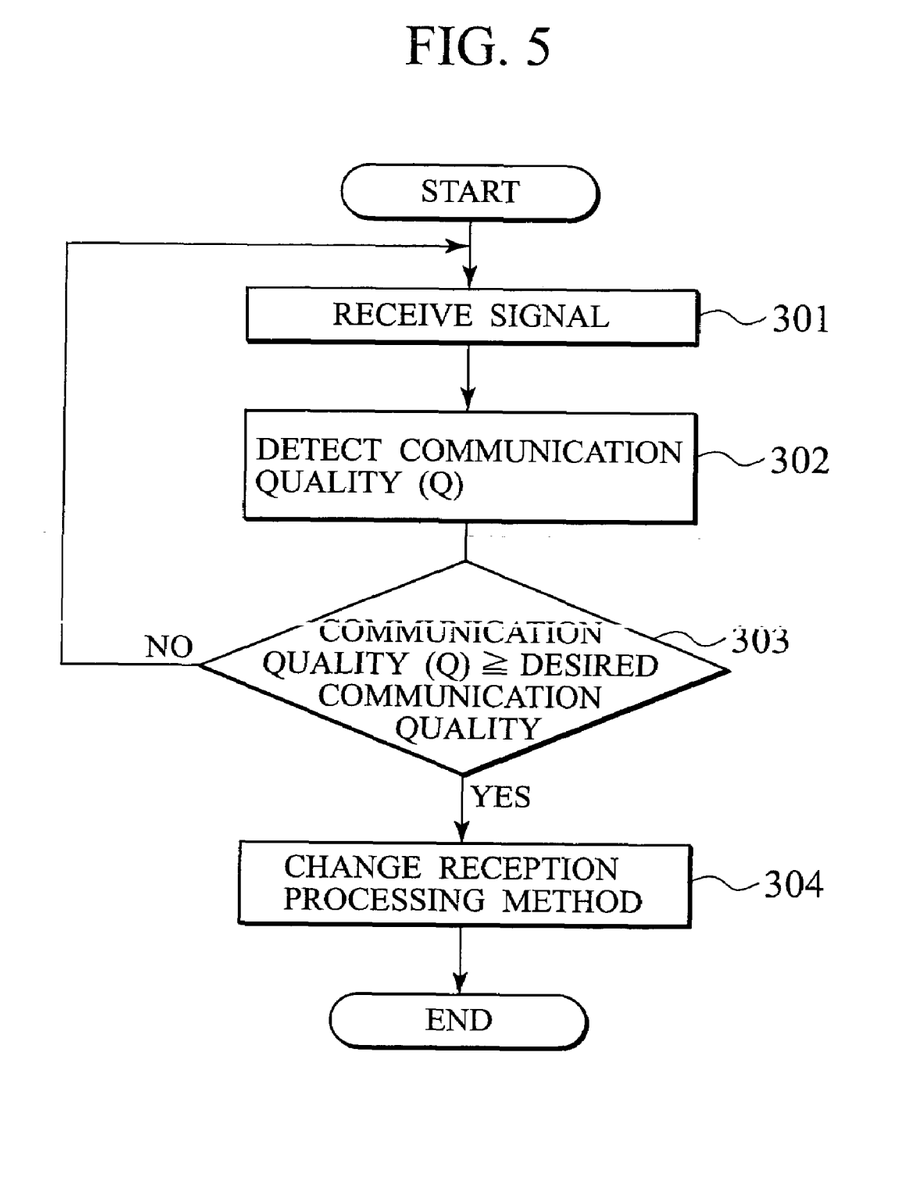
FIG. 5 is a flowchart showing operation of the mobile communication system according to the embodiment of the present invention.

As shown in FIG. 5, in step 301, the reception processing unit 31 of the mobile station 30 carries out reception processing for the data signal a transmitted from the signal transmitting unit 11 of the base station 10 within the predetermined period A.

In step 302, the communication quality detecting unit 32 of the mobile station 30 detects a communication quality (Q) of the received data signal a.

In step 303, the reception processing method deciding unit 33 of the mobile station 30 determines whether the communication quality (Q) of the data signal a detected by the communication quality detecting unit 32 satisfies a desired communication quality.

Herein, the reception processing method deciding unit 33 may determine that the desired communication quality is satisfied when the communication quality (Q) of the data signal a is equal to or higher than the desired communication quality, or when the communication quality (Q) of the data signal a exceeds the desired communication quality.

When the communication quality (Q) of the data signal a satisfies the desired communication quality, the reception processing method deciding unit 33 adaptively changes the reception processing method in step 304.

On the other hand, when the communication quality (Q) of the data signal a does not satisfy the desired communication quality, the operation returns to step 301, where the reception processing unit 31 carries out the reception processing for the retransmission signal a1.

Thereafter, in step 302, the communication quality detecting unit 32 detects a communication quality of the received retransmission signal a1. In step 303, the reception processing method deciding unit 33 determines whether the communication quality (Q) of the retransmission signal a1 satisfies the desired communication quality.

When the communication quality (Q) of the retransmission signal a1 satisfies the desired communication quality, the reception processing method deciding unit 33 adaptively changes the reception processing method in step 304.

On the other hand, when the communication quality (Q) of the retransmission signal a1 does not satisfy the desired communication quality, the operation returns to step 301, where the reception processing unit 31 carries out the reception processing for the retransmission signal a2. Thereafter, similar processing is repeated for the retransmission signals a2 and a3 within the predetermined period A.

A MODIFIED EXAMPLE 1

The present invention is not limited to the above embodiment and can be applied to the following modified example 1.

Figure 6:
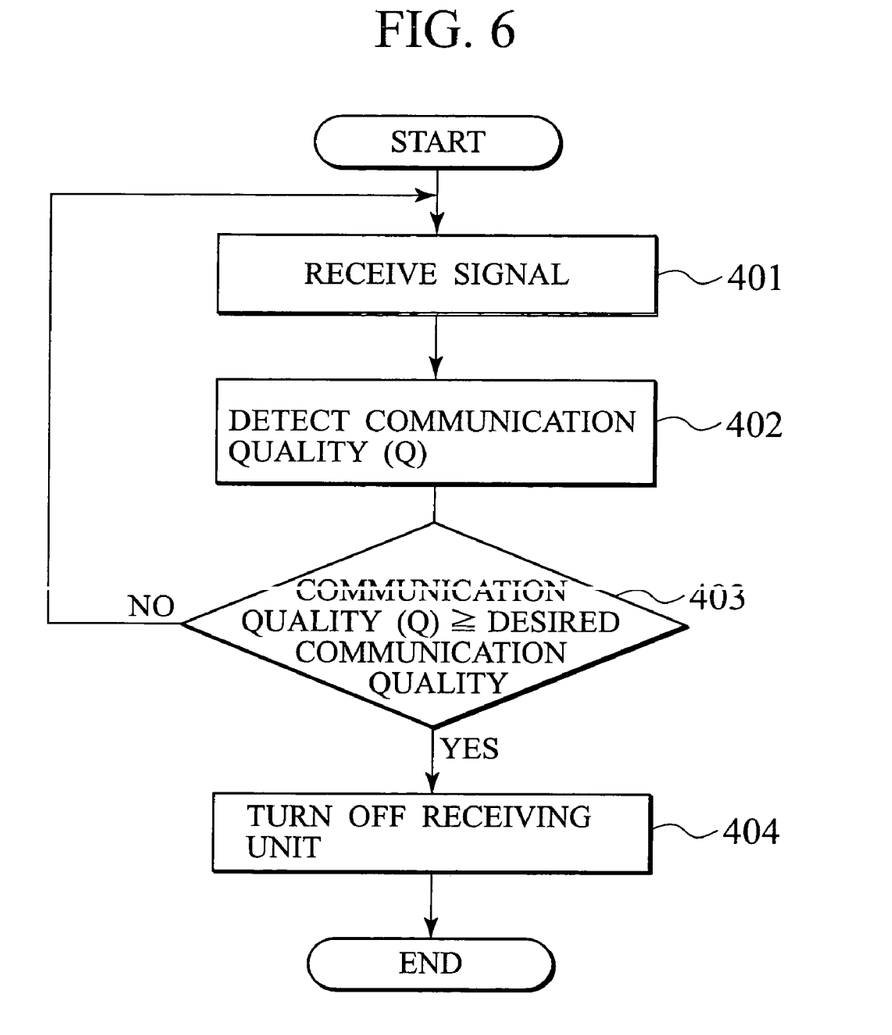
FIG. 6 is a flowchart showing operation of the mobile communication system according a modified example 1 of the present invention.

As shown in FIG. 6, in step 401, the reception processing unit 31 of the mobile station 30 carries out reception processing for the data signal a transmitted from the signal transmitting unit 11 of the base station 10 within the predetermined period A.

In step 402, the communication quality detecting unit 32 of the mobile station 30 detects a "signal error (signal error rate or amount of signal error)", a "signal-to-interference ratio" or a "received power" of the data signal as the communication quality (Q) of the received data signal a.

For example, the communication quality detecting unit 32 detects a "signal error" by determining with an error detection bit in the data signal (e.g., CRC bit) whether or not the data signal is an error.

In step 403, when it is determined that the communication quality (Q) of the data signal a satisfies the desired communication quality, the subsequent retransmission signal a1 is not necessary, so that the reception processing method deciding unit 33 turns off the receiver of the reception processing unit 31.

MODIFIED EXAMPLE 2

The present invention is not limited to the embodiment as described above and can be applied to the following modified example 2.

Figure 7:
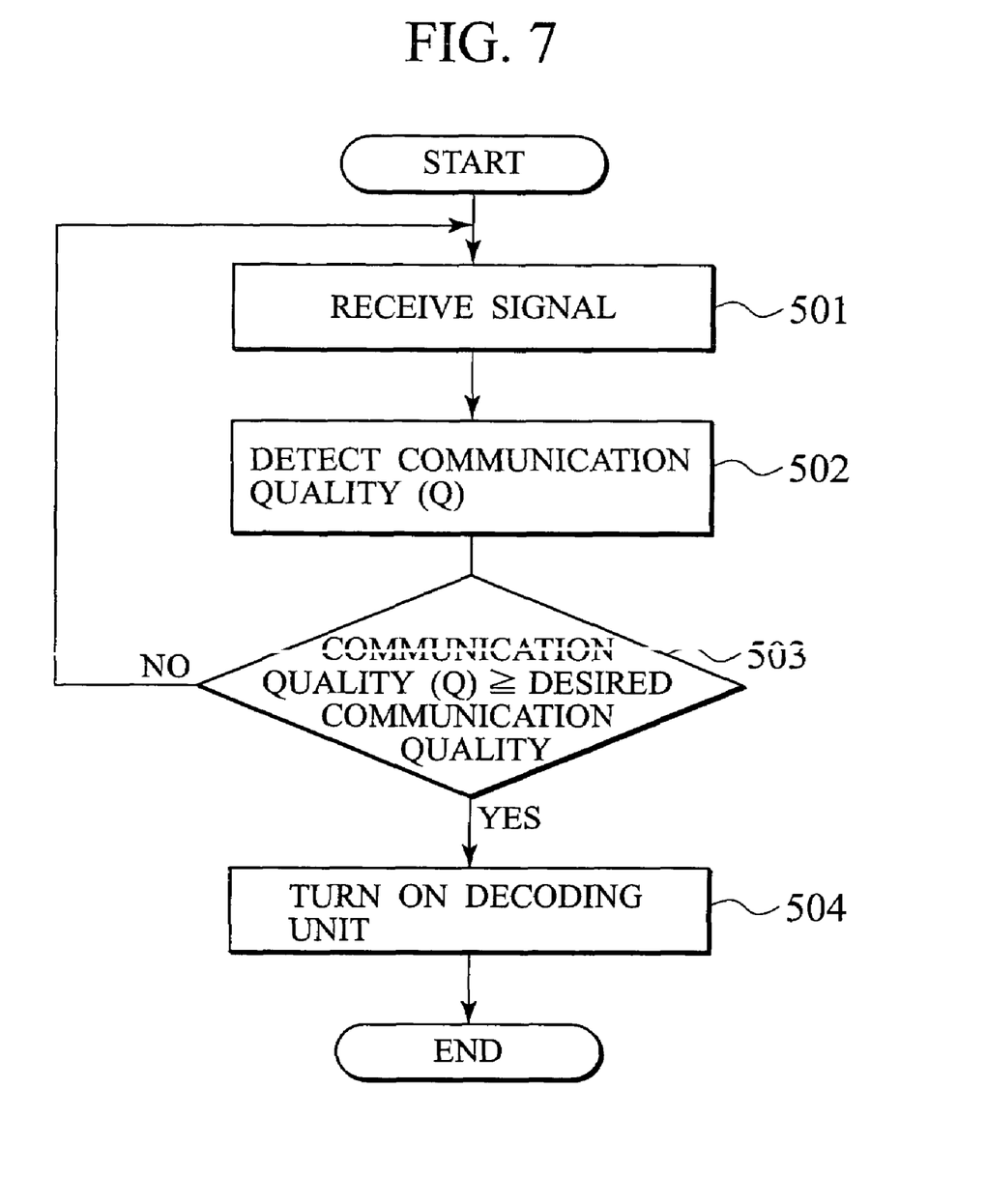
FIG. 7 is a flowchart showing operation of the mobile communication system according to a modified example 2 of the present invention.

As shown in FIG. 7, in step 501, the reception processing unit 31 of the mobile station 30 carries out the reception processing for the data signal a transmitted from the signal transmitting unit 11 of the base station 10 within the predetermined period A.

In step 502, the communication quality detecting unit 32 of the mobile station 30 detects a "signal error (signal error rate or amount of signal error)", a "signal-to-interference ratio" or a "received power" of the data signal as the communication quality (Q) of the received data signal a.

In step 503, when it is determined that the communication quality (Q) of the data signal a satisfies the desired communication quality, the retransmission signal a1 for correctly decoding the data signal a is not necessary, so that the reception processing method deciding unit 33 turns on the decoding unit of the reception processing unit 31.

<Functions and Effects of the Mobile Communication System According to the Embodiment>

According to the mobile communication system of this embodiment, the signal transmitting unit 11 of the base station 10 transmits the data signal a and the retransmission signals a1 to a3 within the predetermined period A, and the reception processing method deciding unit 33 of the mobile station 30 decides the reception processing method for the data signal a or the retransmission signals a1 to a3 in the predetermined period A in accordance with the communication quality detection result of the received signal, so that it is possible to reduce the power consumption of the mobile station 30 without increasing the number of times the data signals are retransmitted from the base station 10 to the mobile station 30.

As described above, according to the present invention, it is possible to provide the mobile communication system which enables a reduction in power consumption of the mobile station without an increase in the number of times the data signals which are to be received by the mobile station are retransmitted, the mobile communication method, and the mobile station suitably used for the same.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A mobile communication system which transmits a data signal from a base station to a mobile station, wherein
the base station comprises a signal transmitter configured to transmit, to the mobile station, both the data signal, and at least one retransmission signal of the same data signal, in a different form from the same data signal, within a predetermined period set for transmission of at least one series of the data signal and the at least one retransmission signal;
the mobile station comprises:
a receiving processor configured to carry out a receiving process on the data signal or the at least one retransmission signal within the predetermined period;
a communication quality detector configured to detect a communication quality of the data signal or the at least one retransmission signal; and
a reception processing method decider configured to decide a reception processing method for the data signal or the at least one retransmission signal in the predetermined period, based on the detected communication quality.

2. The mobile communication system of claim 1, wherein the communication quality detector is configured to detect at least one of a signal-to-interference ratio (SIR) and a received power as the communication quality.

3. The mobile communication system of claim 2, wherein the signal transmitter is configured to transmit the data signal and the at least one retransmission signal as a different encoding series by changing rate matching parameters between the data signal and the at least one retransmission signal within a predetermined period.

4. The mobile communication system of claim 1, wherein the signal transmitter is configured to transmit the data signal and the at least one retransmission signal as a different encoding series by changing rate matching parameters between the data signal and the at least one retransmission signal within a predetermined period.

5. A mobile communication method for transmitting a data signal from a base station to a mobile station, the method comprising:
transmitting, from the base station to the mobile station, both the data signal and at least one retransmission signal of the same data signal, in a different form from the same data signal, within a predetermined period set for transmission of at least one series of the data signal and the at least one retransmission signal;
carrying out a receiving process on the data signal or the at least one retransmission signal within the predetermined period in the mobile station;
detecting a communication quality of the data signal or the at least one retransmission signal in the mobile station; and
deciding a reception processing method for the data signal or the at least one retransmission signal in the predetermined period, based on the detected communication quality.

6. The mobile communication method of claim 5, where detecting the communication quality further comprises detecting at least one of a signal-to-interference ratio (SIR) and a received power as the communication quality.

7. The mobile communication method of claim 6, wherein transmitting the data signal or the at least one retransmission signal further comprises transmitting the data signal and the at least one retransmission signal as a different encoding series by changing rate matching parameters between the data signal and the at least one retransmission signal within a predetermined period.

8. The mobile communication method of claim 5, wherein transmitting the data signal or the at least one retransmission signal further comprises transmitting the data signal and the at least one retransmission signal as a different encoding series by changing rate matching parameters between the data signal and the at least one retransmission signal within a predetermined period.

9. A mobile station for receiving a data signal from a base station, the mobile station comprises:
a receiving processor configured to carry out a receiving process on the data signal or the at least one retransmission signal of the same data signal, within a predetermined period set for transmission of at least one series of the data signal and the at least one retransmission signal;
a communication quality detector configured to detect a communication quality of the data signal or the at least one retransmission signal; and
a reception processing method decider configured to decide a reception processing method for the data signal or the at least one retransmission signal in the predetermined period, based on the detected communication quality.

10. The mobile station according to claim 9, wherein the communication quality detector is configured to detect at least one of a signal-to-interference ratio (SIR) and a received power as the communication quality.

* * * * *